United States Patent [19]

Yudin

[11] Patent Number: 4,983,314

[45] Date of Patent: Jan. 8, 1991

[54] QUICK CAR-COOLING COMPOSITION

[75] Inventor: Cal Yudin, Dunwoody, Ga.

[73] Assignee: North American Oil Company, Inc., Atlanta, Ga.

[21] Appl. No.: 493,209

[22] Filed: Mar. 14, 1990

[51] Int. Cl.$^5$ ............................................... C09K 5/00
[52] U.S. Cl. ........................................ 252/71; 62/64; 62/121; 62/304; 252/73; 252/75; 252/77; 261/DIG. 3; 261/DIG. 4
[58] Field of Search ...................... 252/71, 73, 75, 77; 62/121, 304, 64; 261/DIG. 3, DIG. 4

[56] References Cited

U.S. PATENT DOCUMENTS 4,813,238  3/1989  Tan ......................................... 62/64

Primary Examiner—Paul Lieberman
Assistant Examiner—William S. Parks
Attorney, Agent, or Firm—Mishrilal Jain

[57] ABSTRACT

A quick, car-cooling composition is provided. The composition consists essentially of:
about 5–15% by volume of methanol;
about 20% by volume of a propellent;
about 0.5% by weight of sodium benzoate;
about 0.2% by volume of fragrance;
about 0.2% by volume of morpholine; and
about 64.1 to 74.1% of deionized water.

When sprayed in rapid, intermittent succession, the composition lowers the temperature in a hot confined space.

2 Claims, No Drawings

QUICK CAR-COOLING COMPOSITION

The present invention is related to a composition which brings down the high temperature in a confined space very quickly and safely. More particularly, the present invention is related to a unique formulation which, when sprayed in the hot interior of a passenger car, such as during summer time, quickly lowers the temperature of the passenger compartment to a comfortable level in a safe manner.

U.S. Pat. No. 4,813,238 describes a cooling process for instantly lowering the temperature of the passenger compartment of a vehicle using atomized bursts of an ethanol-water solution. Ethanol being a relatively expensive chemical, a need exists for an improved, efficient and cheaper product.

SUMMARY OF THE INVENTION

It is, therefore, an object of the present invention to provide an inexpensive, efficient and improved quick-cooling composition and method for rapid lowering of the high temperature in a confined space, such as in the interior of a closed vehicle exposed to the sun during the summer time.

Other objects and advantages will become evident from the following detailed description of the invention.

DETAILED DESCRIPTION OF THE INVENTION

The above and various other objects and advantages of the present invention are achieved by a quick-cooling composition, consisting essentially of:
about 5–15% by volume of methyl alcohol;
about 20% by volume of a propellent;
about 0.5% by weight of sodium benzoate;
about 0.2% by volume of fragrance;
about 0.2% by volume of morpholine; and
about 64.1 to 74.1% of deionized water;
the resulting composition being non-explosive and safe when used in a hot confined space for cooling purposes only, prior to the entry or introduction of human beings, pets, animals and the like. It should be noted that although methanol, being more economical, is a preferred component, other components can be easily used in place of methanol so long it is non-explosive and safe for use as described herein and the boiling point of an aqueous mixture of such component is 86° C. or less. Typical examples of methanol-replacing components would be glycol ethers, ketones and the like which would be easily suggested to one of ordinary skill in the art.

A method for quick-cooling of a hot confined space, comprises ventilating the hot confined space and introducing the composition of the present invention in the hot confined space in a rapid succession of intermittent sprays (e.g., every few seconds) until the temperature in said space comes down to a tolerably comfortable level. Typical of temperatures found in hot confined spaces, such as found in vehicles exposed to the sun during summer time, are 110° F. or higher and typical of tolerably comfortable temperatures may be 76°–78° F.

Without being bound to any specific theory, it is believed that the inclusion of morpholine and sodium benzoate in the composition described herein provides protection against such damages as corrosion, water spots, etc. to the interior fabric, metallic parts, leather and the like which may be exposed to the cooling-composition of the present invention. It is noted that due to the relatively high water content of the composition, protection against corrosion and the like is critically desirable. Fragrance means any additive that provides soothing aroma to the spray. As to the propellents, any safe propellent conventional in the industry as would be easily suggested to one of ordinary skill in the art, can be employed.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the methods and materials described herein are preferred. Unless mentioned otherwise, the techniques employed or contemplated herein are standard methodologies well known to one of ordinary skill in the art. The materials, methods and examples are only illustrative and not limiting.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A quick-cooling composition, consisting essentially of:
about 5–15% by volume of methanol;
about 20% by volume of a propellent;
about 0.5% by weight of sodium benzoate;
about 0.2% by volume of fragrance;
about 0.2% by volume of morpholine; and
about 64.1 to 74.1% of deionized water.

2. A method for quick-cooling of a hot confined space, comprising the steps of ventilating a hot, confined space and introducing the composition of claim 1 in said hot confined space in a quick succession of intermittent sprays until the temperature in said space comes down to a tolerably comfortable level.

* * * * *